Patented May 28, 1935

2,003,236

UNITED STATES PATENT OFFICE 2,003,236

PROCESSES OF PRODUCING HIGH VISCOSITY INDEX OILS

Harry T. Bennett, Tulsa, Okla., assignor to Mid-Continent Petroleum Corporation, Tulsa, Okla., a corporation of Delaware.

No Drawing. Application October 22, 1932, Serial No. 639,046

7 Claims. (Cl. 196—13)

This invention relates to processes of producing high viscosity index oils.

Specifically stated the invention relates to a process of treating oils having high and low viscosity index constituents to effect a separation of the oil into fractions having a high viscosity index and a low viscosity index. The invention herein disclosed is more broadly claimed in an application filed by me on March 2, 1931, Serial Number 519,698, and the present application is a continuation in part of said application, Serial No. 519,698.

The viscosity index of an oil is a number indicating the extent to which its viscosity will change when the temperature is increased from 100° F. to 210° F. The viscosity of an oil having a low viscosity index will change very greatly in response to a change in temperature, while an oil having a high viscosity index will withstand such variations in temperature without the same degree of change in its viscosity.

Many hydrocarbon oils which have a relatively low viscosity index contain paraffinic and naphthenic constituents. The naphthenic constituents of an oil tend to give the oil a relatively low viscosity index and if they are removed from the oil, the remaining oil will have a substantially higher viscosity index than the original oil.

Prior to my invention in this art, it has been proposed to produce a high viscosity index oil by removing the naphthenic constituents of the oil. However, these old proposed methods have taken considerable time and when heavy oils containing asphaltic materials have been treated, it has been extremely difficult to obtain an effective separation of the naphthenic constituents from the paraffinic constituents.

An object of this invention, therefore, is to provide a simple and efficient process of removing low viscosity index constituents from an oil.

Another object of this invention is to provide a process which may be rapidly and continuously carried out to provide a commercially feasible method of producing large quantities of high viscosity index oils.

Another object of this invention is to provide a method wherein oils which contain asphaltic materials and other impurities may be effectively treated to remove the low viscosity index constituents without previously removing the asphaltic and other impurities.

Briefly stated, one form of this invention relates to a process of removing low viscosity index constituents from hydrocarbon oils by subjecting the oil to a treatment with a material capable of rendering the low viscosity index constituents of oil removable in a centrifuge, and then subjecting the oil to centrifugal force to separate the oil into low and high viscosity index fractions.

The solvent used may be any solvent which has a selective action for either the high or low viscosity index constituents of the oil, and which will permit one of these constituents to be separated from the other in a centrifuge.

I have found that a halogenated ether, such as dichlorethyl ether, will give excellent results, even when a heavy oil containing asphaltic materials is treated.

Many lubricating oil stocks contain asphaltic and other impurities which are usually removed by expensive acid and clay treatments during the refining of the oil to improve the color of the resultant lubricating oil.

I have found that many of these impurities are removed from the high viscosity index fraction of the oil during the treatment of the oil with a selective solvent, such as herein disclosed, and in some cases it is unnecessary to further remove any of these impurities remaining in the high viscosity index fraction of the oil.

However, when it is believed desirable from the nature of the lubricating oil stock to subject the oil to the usual methods of removing these impurities, they may be removed either before or after treating the oil with the selective solvent.

If both the low and high viscosity index fractions of the oil are to be used as a lubricating oil, the asphaltic and other impurities may be removed either before or after treating the oil with the selective solvent.

When only the high viscosity index fraction of the oil is to be used as a lubricating oil and the low viscosity index fraction is to be used as a fuel oil, etc., I prefer to remove these impurities after treating the oil with the selective solvent. The high viscosity index fraction alone may then be treated to remove any of the asphaltic and other impurities remaining in this fraction of the oil. Since the low viscosity index fraction is to be used as a fuel oil, etc., the expense of removing the large percentage of impurities contained in this fraction of the oil is entirely eliminated.

As a specific illustration of this invention, I will now refer to an oil which has been previously treated to remove asphaltic and other impurities, and has the following properties.

| | | | |
|---|---|---|---|
| Gravity | 23.6 | Cold test | −2 |
| Flash | 515 | Color | 7 |
| Fire | 585 | Carbon residue | 1.3 |
| Viscosities— | | Viscosity index | 75.8 |
| At 100° F | 2018 | | |
| At 210° F | 115.7 | | |

A mixture of four parts dichlorethyl ether and one part of said oil is agitated at a temperature of about 100 to dissolve the low viscosity index constituents in the dichlorethyl ether. The resultant product is subjected to centrifugal force in any suitable centrifuge to rapidly separate the dissolved naphthenic or low viscosity index constituents from the paraffinic or high viscosity index constituents.

The dichlorethyl ether may then be removed from both fractions of the oil by distilling the same.

The high viscosity index fraction of the oil which is 53.5 percent of the oil, will have a viscosity index of 90.2, and the low viscosity index fraction will have a viscosity index of 10.8.

As a further illustration of my invention, I will show how the following heavy low viscosity index lubricating oil stock containing asphaltic and other impurities, which are usually removed by treatments with sulphuric acid and clay during the refining of a lubricating oil, may be treated in accordance with my invention.

| | | | |
|---|---|---|---|
| Gravity | 20.4 | Cold test | 45 |
| Flash | 550 | Color | Green |
| Fire | 625 | Carbon residue | 4.3% |
| Viscosities— | | Viscosity index | 75 |
| At 100° F | 6000 | | |
| At 210° F | 214 | | |

Four parts of dichlorethyl ether may be mixed with one part of said heavy oil at a temperature of about 110° F. to dissolve the low viscosity index constituents in the dichlorethyl ether. The oil and dichlorethyl ether are then subjected to centrifugal force to separate the dissolved low viscosity index constituents from the high viscosity index constituents.

The resultant products may be separately distilled to recover the dichlorethyl ether.

The high viscosity index fraction may then be refined by the usual methods, such as a clay treatment or acid and clay treatments, to further remove impurities from this fraction of the oil. Since a large quantity of the impurities were removed from the high viscosity index fraction during the treatment with dichlorethyl ether, it will be understood that the amount of acid required is substantially less than the amount usually employed when the acid alone is relied upon for the removal of such impurities.

The finished high viscosity index lubricating oil will have a relatively high viscosity index of 90 as compared to the relatively low viscosity index of 75 of the original oil.

Since the separation of the oil into high and low viscosity index fractions may be carried out in a centrifuge, the time required for the separation will be relatively short and the oil may be continuously supplied to the centrifuge to avoid the delays of batch treatments.

The dichlorethyl ether is also known as "dichlor-diethyl ether." It is a chlorinated ether, and in actual practice it is desirable to use a solvent of this kind known as BB' (beta beta prime) dichlorethyl ether, as claimed in the aforesaid application Serial No. 519,698, filed by me on March 2, 1931.

I claim:

1. In the art of making high viscosity index oils from low viscosity index oils containing asphaltic materials, the process which comprises treating the oil including its asphaltic content with a chlorinated ether to effect a separation of the oil into high and low viscosity index fractions, removing the chlorinated ether from said fractions, and treating said high viscosity index fraction to further remove asphaltic materials.

2. The method of treating oils containing paraffinic and naphthenic hydrocarbons which comprises mixing said oils with dichlor-diethyl ether, regulating the temperature of the mixture whereby the mixture separates into a paraffinic oil phase containing dissovled dichlor-diethyl ether and a dichlor-diethyl ether phase containing naphthenic oil, removing one phase from the other, and removing the ether from the oil in each phase; said method including a step wherein the paraffinic oil is given a light treatment with sulphuric acid.

3. The method of treating oils containing paraffinic and naphthenic hydrocarbons which comprises mixing said oils with dichlor-diethyl ether, regulating the temperature of the mixture whereby the mixture separates into a paraffinic oil phase containing dissolved dichlor-diethyl ether and a dichlor-diethyl ether phase containing naphthenic oil, removing one phase from the other, and removing the ether from the oil in each phase; said method including a step wherein the oils are treated with sulphuric acid prior to the mixture thereof with dichlor-diethyl ether.

4. The method of treating oils containing paraffinic and naphthenic hydrocarbons which comprises mixing said oils with dichlor-diethyl ether, regulating the temperature of the mixture whereby the mixture separates into a paraffinic oil phase containing dissolved dichlor-diethyl ether and a dichlor-diethyl ether phase containing naphthenic oil, removing one phase from the other, and removing the ether from the oil in each phase; said method including a step wherein the oil is given a light sulphuric acid treatment and finished by contacting with clay.

5. The method of treating oils containing paraffinic and naphthenic hydrocarbons which comprises mixing said oils with dichlor-diethyl ether, regulating the temperature of the mixture whereby the mixture separates into a paraffinic oil phase containing dissolved dischlor-diethyl ether and a dichlor-diethyl ether phase containing naphthenic oil, removing one phase from the other, and removing the ether from the oil in each phase; said method including a step wherein the paraffinic oil is finished by contacting with clay.

6. The method of removing naphthenic compounds and other undesirable components from mixed base lubricating oils which comprises heating and agitating the oil with dichlor-diethyl ether, cooling the oil and solvent until separation of paraffinic compounds from the solvent occurs, and separating the solvent together with its extract from the treated oil; said method including a step wherein the oil is also given a light treatment with sulphuric acid.

7. The method of removing naphthenic compounds and other undesirable components from mixed base lubricating oils which comprises heating and agitating the oil with dichlor-diethyl ether, cooling the oil and solvent until separation of paraffinic compounds from the solvent occurs, and separating the solvent together with its extract from the treated oil; said method including a step wherein the paraffinic oil is finally finished by contacting with clay.

HARRY T. BENNETT.